Figure 1:
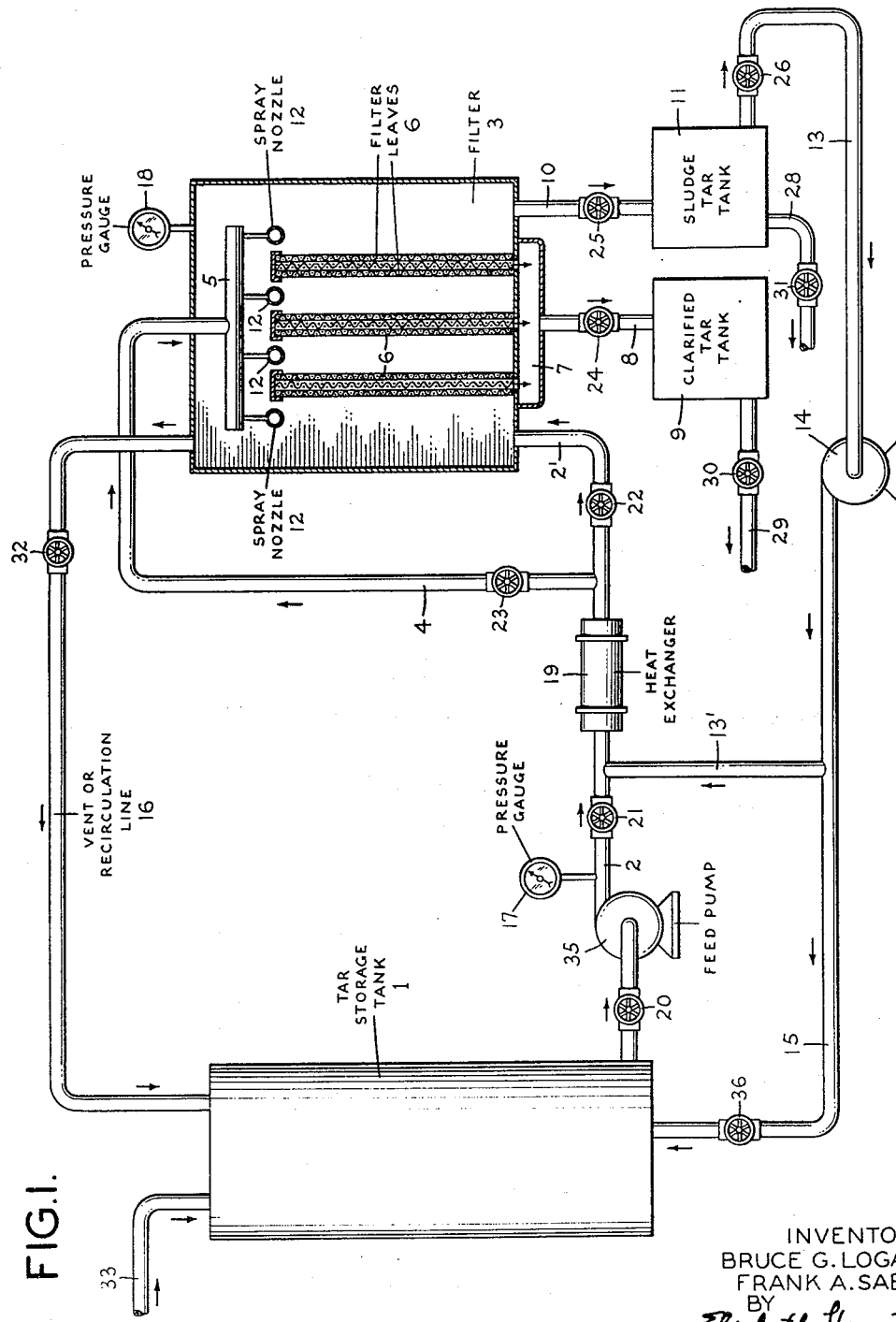

United States Patent Office

2,956,944
Patented Oct. 18, 1960

2,956,944

PROCESS FOR FILTERING TAR

Bruce G. Logan, Yonkers, N.Y., and Frank A. Sabia, Palisades Park, N.J., assignors to Allied Chemical Corporation, a corporation of New York Filed Feb. 10, 1958, Ser. No. 714,349

4 Claims. (Cl. 208—39)

This invention relates to the treatment of tar, and more particularly to a new and improved method of treating the tars obtained during the pyrolysis of coal exemplified by coke-oven tars and pitches obtained therefrom, to produce products having predetermined desired proportions of quinoline-insoluble contents.

Crude tars, for example coal tars, usually contain appreciable quantities of finely divided solid particles which may range in size from less than 2 microns to 10 microns or larger in size. These particles are insoluble in quinoline and are generally known in the art as "quinoline-insolubles." The presence of these solid particles detracts from the value of the tars for many purposes, particularly for their use as saturants for porous materials, the shortcomings of such tars being attributed to blocking of the surface pores by these solid particles and the deposition of layers thereof on the surface of the porous materials to be saturated.

Tars of low solid particle content, i.e. of low "quinoline-insoluble" content are in great demand for coating and impregnating such porous materials as roofing felt, fibre conduit paper and the like.

On the other hand, tars containing high proportions of quinoline-insolubles, i.e. higher than those usually occurring in the crude tars, are also useful, and in great demand for the production of carbon pitches for use in the manufacture of carbon electrodes.

A number of attempts have been made in the past to treat quinoline-insoluble-containing tars to produce a clarified portion for saturation use and a second portion enriched with respect to quinoline-insolubles for carbon pitch use. Such efforts have involved various filtration or centrifuging processes which have introduced problems arising from heavy cake build up on the filters unless extraneous solvents are added to the tars, leading to decreased operating capacity and loss of time in removing the dense cakes. Centrifuging has been unsatisfactory in that it tends to remove only the coarser particles leaving the fines in the treated tar. Other treatments have involved filtration processes in which the tar is passed across a filter screen at a controlled velocity, whereby part of the tar passes through the filter, yielding a tar of low insoluble particle content, while the remaining portion of the tar which does not pass through the filter contains an enhanced insoluble particle content and flows on to a separate discharge line. While this latter treatment was apparently successful in providing a clarified tar portion of low insoluble particle content, it does so with a considerable waste of tar, and the production of quinoline-insoluble-enriched portion of uncontrolled solids content depending on the insoluble content of the crude tar treated.

It is an object of the present invention to provide a process for treating crude tars containing appreciable quantities of "quinoline-insoluble" particles to provide modified tars of predetermined controlled quinoline-insoluble content.

It is a further object of the invention to provide a clarified tar containing quinoline-insoluble contents of not more than about 0.5% and a sludge-tar containing controlled quinoline-insoluble contents up to about 35% or more.

These and other objects are accomplished according to our invention wherein crude tars containing at least about 1% of quinoline-insoluble material and having viscosity characteristics no higher than about 100 SSU in the temperature range between about 175° and about 500° F. are subjected to pressure filtration at temperatures between about 175° F. and about 500° F. at pressures ranging from about 20 p.s.i.g. to final pressures of not more than about 200 p.s.i.g., through a filter medium no coarser than 24 x 110 mesh, and thereafter recovering clarified tar filtrate and removing the filter cake from the filtering means by sluicing with tar, and dispersing the solid cake in the sluicing medium.

Figure 2:
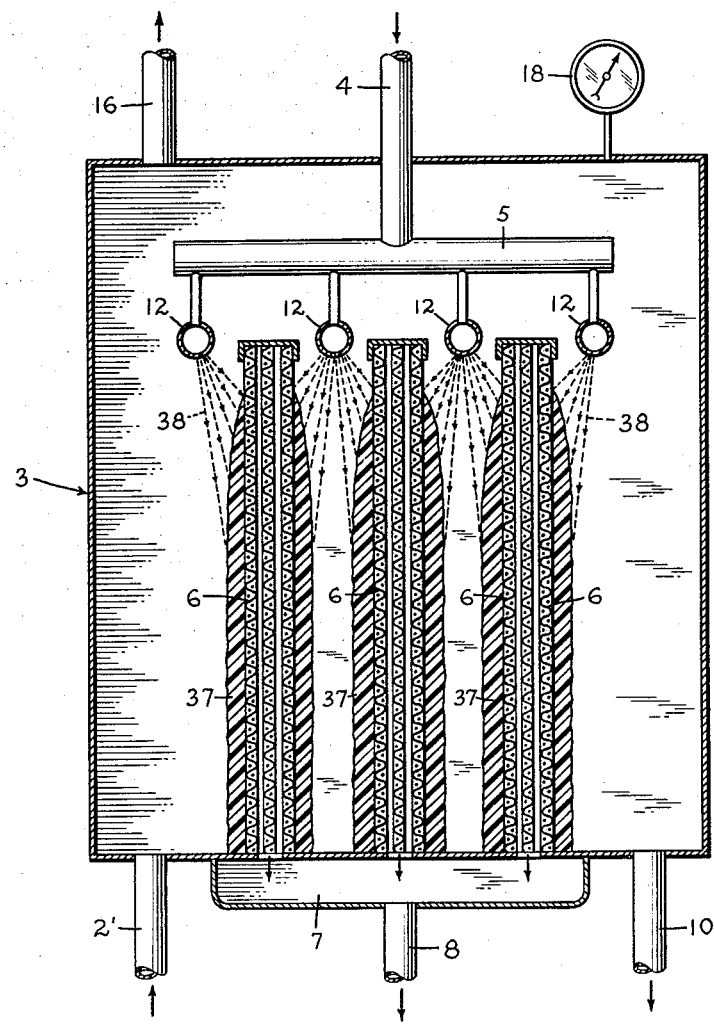

In the drawings, Figure 1 illustrates in schematic form a suitable arrangement for carrying out the process of the invention. Figure 2 is a detail of the filter portion illustrating the spray nozzles in operation during the filter cake removal cycle. The drawings are illustrative only as other arrangements and other filter types are suitable as explained more fully hereinafter.

Referring to the drawings, like characters denote like parts throughout. Numeral 1 denotes a tar storage tank having tar inlet 33 and being connected by feed line 2—2' through valve 20, centrifugal pump 35, valve 21, heat exchanger 19 and valve 22, to filter 3, and by line 2—4 through valve 20, pump 35, valve 21 heat exchanger 19 and valve 23 to spray head 5. Filter 3 is equipped with a plurality of vertical filter leaves 6 (greatly enlarged) internally connected to filtrate reservoir 7, which leads through valve 24 and common line 8 to clarified tar storage tank 9 which is equipped with drain line 29 closed by valve 30. Filter 3 proper is connected by line 10 through valve 25 to sludge tar tank 11 which is equipped with drain line 28 closed by valve 31. Spray head 5 is equipped with a plurality of nozzles 12 positioned above and intermediate the filter leaves, with an additional nozzle beyond each terminal leaf. Sludge tar tank 11 is connected through valve 26 and line 13—13' to spray head 5 through recirculating pump 14, heat exchanger 19 and valve 23 and line 4. Sludge tank 11 is connected to crude tar storage tank 1 through line 13, pump 14, line 15 and valve 36. The top of filter 3 is connected to storage tank 1 through vent or recirculating line 16 containing valve 32. Pressure gauge 17 is attached to line 2 and pressure gauge 18 is connected with the interior of filter 3.

In operation, with valves 20, 21, 22, 24 and 30 open, and valve 23 closed, tar is forced by feed pump 35 through lines 2—2', passing through heat exchanger 19 and into filter 3 under full pump pressure, as indicated on pressure gauge 17. The tar filters through filter leaves 6, and as it does so, it builds up a filter cake on the outsides of the leaves, the pressure on the cake building up as its thickness increases. The filtrate passes into reservoir 7 and thence into clarified tar tank 9. At the start-up, filtrate is withdrawn through line 29 until the pressure on the filter cake reaches the desired value and the filtrate has the desired degree of clarity. This initial portion of the filtrate may be returned to crude storage through lines not shown. When the pressure in the filters reaches the desired value, as indicated on pressure gauge 18, usually about 20–30 p.s.i.g., the valve 30 is closed and collection of clarified tar begins. The pressure on the filters rapidly builds up to maximum pump pressure where it is held until the filtering rate becomes so slow as to be uneconomic, or the filter becomes filled to capacity with filter cake. When this point is reached, valves 21, 22 and 24 are closed, valve 25 is opened and the contents of the filter are drained out through line 10 into sludge tar tank 11. Valves 26 and 23 are then opened and tar in the sludge tank is fed through recirculating pump 14 and heat exchanger 19 into spray head 5 and through nozzles 12, directing sprays of tar 38 onto each of the filter leaves which removes the cake 37 (Fig. 2) from the filter and blends with the cake solids and sluices the slurry through filter outlet 10 back into sludge tar tank 11. Recirculation is continued until all the cake has beeen removed from the filter leaves, when recirculation may be stopped by closing valves 23 and 26 and quinoline-insoluble enriched sludge tar drained into tank 11. The process is then reversed and a new filtration is begun. Meantime both clarified tar tank and sludge tar tank may be emptied and readied for the new cycle.

If desired, only part of the tar drained from filter 3 at the end of the filtration cycle may be used for sluicing, or alternatively, fresh tar may be used in whole or in part for the sluicing and is especially desirable at the end of the sluicing cycle to insure proper cleansing of the filter leaves prior to initiating a subsequent filtration cycle.

The coal tar and coal-tar pitch products produced therefrom, suitable for use in the process of our invention are heavy hydrocarbons which may be termed pyrogenous hydrocarbon condensates resulting from the destructive distillation of coals. Suitable tars and pitches have viscosities of not more than about 100 SSU (Saybolt Seconds Universal) at temperatures between about 175° F. and about 500° F. preferably having viscosities of between about 30 and about 50 SSU at temperatures between about 200° F. and about 350° F. The quinoline-insoluble fraction of such tars comprises those components which are insoluble in the fluid tar and which are visible therein when viewed under a microscope. The quinoline-insoluble content of a tar or pitch may be determined by digesting a sample (approximately 1 to 5 grams, depending on the insoluble content of the sample), in 25 ml. of quinoline at 70°–80° C., and filtering the sample hot through a mat of diatomaceous earth. After washing with additional hot quinoline in a crucible, the crucible and contents are rinsed with benzene and then dried and weighed.

The quinoline-insoluble content of crude tars as produced, varies considerably even from the same tar producer, due to changes in requirements for coke, which result in lengthening or shortening the coking cycle. Pitches are produced from the crude tars by removal of so-called "oil distillate" by volatilization. This oil distillate normally comprises between about 30% and about 50% by weight of the tar, so that in reducing the tars to pitches, the quinoline-insoluble content is proportionately increased. Consequently, to produce a pitch of a desired quinoline-insoluble content, the crude tars utilized for such production must contain quinoline insoluble contents of between about 70% and about 50% of the quinoline-insoluble content required in the finished pitch product.

In the past, tars from many coke ovens have contained up to say 8% of quinoline insolubles while others have contained considerably less, for example from 3 to 5%. Thus it has been possible to supply certain customer requirements within these ranges by blending of crude tars from several sources. In recent years however, many coke ovens have reduced operations so that tars of the higher quinoline-insoluble contents are no longer available for blending to meet specifications.

Tars for saturating fibre conduits require very low quinoline-insoluble contents. Thus for most fibre conduit uses, values below about 0.5% are usually required and for some uses very low values from 0.00 to about 0.05% are specified.

On the other hand many producers of carbon electrodes require pitches having very high quinoline-insoluble contents, for example in the range of 10 to 40%. Thus, since pitches are produced from tars by removal of distillate oil, as brought out above, the quinoline-insoluble contents of the tars used in producing these pitches must be from 5 to 28%. Recently tars containing 17% to 18% quinoline-insolubles have been in wide demand for this purpose.

The average quinoline-insoluble content of tars presently available is between about 4% and about 5% although tars as low as 2% in quinoline-insolubles are sometimes produced. According to the process of our invention, tars having quinoline-insoluble contents of any desired concentration between about 0.01 or below, up to about 35% may be prepared from such tars or from tars of lower or higher quinoline-insoluble contents, in the ranges from about 1% to about 12%.

For the filtration according to our invention, any standard vertical leaf filter, either stationary leaf or rotary type may be utilized, provided the screens are of such design and mesh dimensions that when crude tar is passed through them, the openings are of such size that the larger particles of the quinoline-insoluble material, are retained thereon, thereby decreasing the effective size of the openings. These openings in turn retain the smaller particles and build up a dense filtering medium capable of removing substantially all quinoline-insoluble material. Thus, suitable filter screens are those no coarser than about 24 x 110 mesh, filters of finer mesh sizes may be used, for example, 28 x 500 mesh; 80 x 700 mesh down to about 100 x 950 mesh, although the latter is so fine as to be less advantageous economically. In general we prefer to use filters of sizes between 24 x 110 mesh and 28 x 500 mesh. The 24 x 110 mesh screens will usually be made up of wires having diameters of 0.016 inch and 0.011 inch respectively, thus having openings of about 0.0064 inch or about 162 microns. The 28 x 500 mesh screens will usually be made up of wires having diameters of 0.0085 inch and 0.0045 inch respectively, and having openings of about 0.0023 inch or about 58 microns. While the particle sizes of even the largest quinoline-insoluble particles may be considerably smaller than these openings, bridging occurs during filtration and a mat quickly builds up to retain virtually all of the quinoline-insoluble solids.

The filter must also be equipped with suitable nozzles positioned so as to remove the filter cake by the hydraulic impact of the sluice tar. In general nozzles providing a square, round or double fish tail spray are suitable, if positioned above and between adjacent filter leaves, so that one spray serves two filter surfaces, with a spray to serve each terminal filter surface, that is to say, the number of spray nozzles required will be equal to the number of filter leaves plus 1. Pressure on the spray nozzles may conveniently be in the range between about 40 p.s.i.g. and about 60 p.s.i.g.

Filtration temperatures will depend to considerable extent on the viscosity characteristics of the tar, and should be such as to provide a fluid tar having a viscosity of between about 30 SSU and about 100 SSU at operating temperatures preferably between about 35 SSU and about 50 SSU. Coal tars as usually produced, having between about 4% and about 5% quinoline insolubles, usually attain optimum operating viscosities of about 35–50 SSU at temperatures between about 250° F. and about 325° F. If pitches are to be filtered, i.e. tars which have been processed to remove distillate oil, and which are consequently heavier and more viscous, higher temperatures will be used to obtain operating viscosities, for example temperatures as high as about 500° F. may be necessary to obtain a viscosity in the desired viscosity range of 30–100 SSU.

Filtration pressures may range from about 20 p.s.i.g. up to about 200 p.s.i.g. or higher, pressures between about 30 p.s.i.g. and about 100 p.s.i.g. usually being optimum and preferred. In general we find it convenient to maintain the tar being fed to the filter under a constant pressure, as by a centrifugal pump. Thus at the start of the filtration through clean filters, the pressure in the filter will be atmospheric at the start, but will increase as a filter mat builds up on the screens. When the filter pressure reaches between about 20 and about 30 p.s.i.g., collection of the filtrate is commenced, as the filtrate usually contains less than 0.5% quinoline-insoluble material at this stage. Pressure rapidly builds up to the maximum pump pressure, usually in a matter of 2-7 minutes, and collection continues at the maximum pressure either until the filter is filled with cake, or until the filtration rate becomes so slow as to be uneconomic as discussed below.

Rate of filtration of the tar is surprisingly rapid, and we find, that, operating at pressures of about 80-100 p.s.i.g. at 35-50 SSU viscosity, average filtration rates of 0.75 to 2.50 gallons per square foot of filtering area per hour are obtained. Initial filtration rates may be considerably higher, for example as high as 3 gallons/sq. foot/hour or higher at the start of filtrate collection, i.e. after build-up of 20-30 p.s.i.g. in the filter. As filtration proceeds and the mat thickens, the filtration rate decreases somewhat, and eventually becomes so slow as to be uneconomic, usually after about one to two hours' operation. The exact rate at which continuance of the filtration becomes uneconomic is not a definite rate but depends on the relation of the rate to the sluicing time required to cleanse the filters. In general however filtration rate becomes uneconomic when it approaches about 0.5 gallon/sq. foot/hour. Usually filtration times of not more than about 2 hours will be employed between recycles, preferably not more than about 1 hour. During such filtration periods, average filtration rates should not be less than about 0.75 gallon per square foot of filter area per hour, and, for a 1 hour filtration period, such rates may average between about 1.25 and about 2.50 gallons per square foot per hour. In a two hour period, a lower average filtration rate will usually result, for example, from about 0.90 to about 1.50 gallons per square foot per hour, usually accompanied by a decrease in the quinoline-insolubles of the filtrate.

The sluicing operation is carried out by draining the tar remaining in the filter at the close of a filtration cycle, and recirculating this tar in whole or in part or replaced or supplemented by additional fresh tar, through the sluicing sprays to remove the filter cake from the screens. As the sluicing and recirculating continues, the quinoline-insoluble material becomes dispersed in the sludge tar, producing a tar of high quinoline-insoluble content, the precise concentration of which will depend on the initial quantity of tar used for sluicing and the quantity of solids on the filters. If a higher quinoline-insoluble product is desired, the enriched quinoline-insoluble tar sludge may be retained until the next cycle and reused as sluice tar instead of fresh tar drained from the tank at the close of a second filtration cycle. In this way, using the same sludge tar for sluicing in a series of cycles, the quinoline-insoluble content of the tar may be built up to any desired concentration up to that at which the viscosity of the sludge tar becomes too high at the operating temperature to act as an effective sluicing medium. In general a concentration of about 35% quinoline-insoluble content is about the maximum which can practicably be reached. The filter cake itself usually contains about 50 to 60% quinoline—insoluble matter and appears as a fairly dry mat.

Sluicing of the filter cake should be commenced substantially immediately after cessation of the filtration cycle while the filter cake is still hot. If allowed to cool below about 250° F., sluicing is not readily capable of dislodging the mat from the filters. Tar to the sluicing nozzles should be at a temperature between about 200° F. and about 400° F., preferably between about 250° F. and about 325° F. and should not exceed about 100 SSU viscosity at these temperatures. It will be fed under positive pressures of about the same magnitude as used on the filter, varying as required to adequately remove the cake. Pressures between about 50 p.s.i.g. and about 100 p.s.i.g. will usually suffice. The cake will usually be readily removed by the sprays and will redisperse during the recycling operation. If desired, however, agitation may be provided in the sluice tar tank to disperse the filter solids more rapidly and completely in the sluice tar.

The effect of a series of filtration and sluicing cycles on the build-up of quinoline-insolubles in the sludge tar is illustrated in Table I below.

TABLE I

|  | Quantity, Pounds | Quinoline-Insoluble, Weight Percent | Quinoline-Insoluble, Pounds |
|---|---|---|---|
| First Filtration: |  |  |  |
| Tar Feed | 5,000 | 4.0 | 200 |
| Tar Filtrate | 4,625 | 0.3 | 13 |
| Tar Filter Cake | 375 | 50.0 | 187 |
| Sluice Tar—Start | 6,000 | 4.0 | 240 |
| Sluice Tar—Finish | 6,375 | 6.7 | 427 |
| Second Filtration: |  |  |  |
| Tar Feed | 5,000 | 4.0 | 200 |
| Tar Filtrate | 4,625 | 0.3 | 13 |
| Tar Filter Cake | 375 | 50.0 | 187 |
| Sluice Tar—Start | 6,375 | 6.7 | 427 |
| Sluice Tar—Finish | 6,750 | 9.1 | 614 |
| Third Filtration: |  |  |  |
| Tar Feed | 5,000 | 4.0 | 200 |
| Tar Filtrate | 4,625 | 0.3 | 13 |
| Tar Filter Cake | 375 | 50.0 | 187 |
| Sluice Tar—Start | 6,750 | 9.1 | 614 |
| Sluice Tar—Finish | 7,125 | 11.2 | 801 |
| Summary—Three Filtration Cycles: |  |  |  |
| Tar Feed and Sluice Tar | 21,000 | 4.0 | 840 |
| Tar Filtrate | 13,875 | 0.3 | 39 |
| Sluice Tar of Sludge Tar | 7,125 | 11.2 | 801 |

A similar result in build-up of quinoline-insoluble content of the sludge tar is obtained during a single filtration using a smaller quantity of sluicing tar as illustrated in Table II below.

TABLE II

| Filtration | Quantity, Pounds | Quinoline-Insoluble, Weight Percent | Quinoline-Insoluble, Pounds |
|---|---|---|---|
| Tar Feed | 5,000 | 4.0 | 200 |
| Tar Filtrate | 4,625 | 0.3 | 13 |
| Tar Filter Cake | 375 | 50.0 | 187 |
| Sluice Tar—Start | 2,000 | 4.0 | 80 |
| Sluice Tar—Finish | 2,375 | 11.2 | 267 |

The concentration of quinoline-insolubles in the sludge tar may be further increased by limiting the amount of sluice tar used up to a practical maximum of about 35% quinoline-insolubles, as illustrated in Tables III, IV and V respectively.

TABLE III

| Filtration | Quantity, Pounds | Quinoline-Insoluble, Weight Percent | Quinoline-Insoluble, Pounds |
|---|---|---|---|
| Tar Feed | 5,000 | 4.0 | 200 |
| Tar Filtrate | 4,625 | 0.3 | 13 |
| Tar Filter Cake | 375 | 50.0 | 187 |
| Sluice Tar—Start | 832 | 4.0 | 33 |
| Sluice Tar—Finish | 1,207 | 18.25 | 220 |

TABLE IV

| Filtration | Quantity, Pounds | Quinoline-Insoluble, Weight Percent | Quinoline-Insoluble, Pounds |
|---|---|---|---|
| Tar Feed | 5,000 | 4.0 | 200 |
| Tar Filtrate | 4,625 | 0.3 | 13 |
| Tar Filter Cake | 375 | 50.0 | 187 |
| Sluice Tar—Start | 444 | 4.0 | 18 |
| Sluice Tar—Finish | 819 | 25.0 | 205 |

TABLE V

| Filtration | Quantity, Pounds | Quinoline-Insoluble, Weight Percent | Quinoline-Insoluble, Pounds |
|---|---|---|---|
| Tar Feed | 5,000 | 4.0 | 200 |
| Tar Filtrate | 4,625 | 0.3 | 13 |
| Tar Filter Cake | 375 | 50.0 | 187 |
| Sluice Tar—Start | 180 | 4.0 | 7 |
| Sluice Tar—Finish | 555 | 35.0 | 194 |

Thus tars of any desired quinoline-insluble contents between that of the clarified tar (which may run as low as about 0.01% quinoline-insoluble content) up to the practical maximum of about 35% may be prepared according to our invention by the procedures outlined, either directly by controlling the quantity and character of the sluice tar used or by blending enriched quinoline-insoluble tar fractions with crude tars of lower quinoline-insoluble content or even with clarified tars.

The clarified, low quinoline-insoluble content tars of our invention are useful as saturants for porous materials such as roofing felt, paper, fibre conduits, etc. The sludge tars, containing higher quinoline-insoluble contents are useful, for example in the manufacture of carbon electrodes, in rubber compounding etc. and also in road tars, for which intermediate quinoline-insoluble contents are also useful. Specifications of quinoline-insoluble contents in all these fields vary widely depending on the particular needs of the particular user.

The following specific examples will further illustrate our invention. Parts are by weight except as otherwise noted. In the tars used in the examples, the liquid portions had a density of about 1.17, i.e. weighed approximately 9.75 pounds per gallon.

Example 1

688 gallons of crude tar containing 7.6% quinoline-insoluble material and having a viscosity at 340° F. of 38 SSU, was fed at about 340° F. to a vertical leaf filter equipped with screens of 24 x 110 mesh, and with sluicing nozzles positioned above the leaves, until a pressure in the filter of 50 p.s.i.g. was built up, when collection of filtrate was commenced. The pressure in the filter was allowed to build up to 80 p.s.i.g. in about 20 minutes, at which point the filtration rate was about 1.69 gallons per square foot of filter area per hour. Filtration was continued while maintaining the pressure at about 80 p.s.i.g. until the filtration rate had dropped to about 1.13 gallons per square foot per hour, a period of about 1⅓ hours during which time the filtration rate averaged 1.40 gallons per square foot per hour. Filtration was then stopped. The clarified tar in the filtrate, amounting to 589 gallons, was tested and found to contain 0.08% quinoline-insoluble material. The filter cake weighed 1018 pounds and contained about 50% by weight of quinoline-insoluble material. The tar in the filter was then drained and returned to the feed tank. Approximately 792 gallons of sludge tar from a previous run, containing 11.7% quinoline-insolubles, was passed into a sludge tar tank from which it was fed into the sluicing nozzles, after adjusting its temperature to about 340° F. until the filters were clear of solids, i.e. a period of about 45 minutes. Then the sluice tar was collected in the sludge tar tank. The sludge tar amounting to 881 gallons had a quinoline-insoluble content of 16.1%.

Example 2

598 gallons of crude tar containing 4.2% quinoline-insoluble material and having a viscosity at 325° F. of 41 SSU, was fed at about 325° F. to a vertical leaf filter equipped with screens of 24 x 110 mesh, and with sluicing nozzles positioned above the leaves, until a pressure in the filter of 50 p.s.i.g. was built up, when collection of filtrate was commenced. The pressure in the filter was allowed to build up to 80 p.s.i.g. in about 20 minutes, at which point the filtration rate was about 2.31 gallons per square foot of filter area per hour. Filtration was continued while maintaining the pressure at about 80 p.s.i.g. until the filtration rate had dropped to about 0.90 gallons per square foot per hour, a period of about 1⅓ hours during which time the filtration rate averaged 1.26 gallons per square foot per hour. Filtration was then stopped. The clarified tar in the filtrate, amounting to 552 gallons, was tested and found to contain 0.27% quinoline-insoluble material. The filter cake weighed 464 pounds and contained about 50% solids. The tar in the filter amounting to about 434 gallons was then drained into a sludge tar tank from which it was fed into the sluicing nozzles, after adjusting its temperature to about 350° F. The sluicing tar, spraying onto the filter leaves, washed accumulated cake from the leaves, and this tar, with accumulated filter solids, was recirculated through the system while maintaining its temperature at about 350° F. until the filters were clear of solids, i.e. a period of about 45 minutes. Then the sluice tar was collected in the sludge tar tank. The sludge tar, amounting to 480 gallons, had a quinoline-insoluble content of 8.7%.

Example 3

702 gallons of crude tar containing 4.2% quinoline-insoluble material and having a viscosity at 338° F. of 38 SSU, was fed at about 338° F. to a vertical leaf filter equipped with screens of 24 x 110 mesh, and with sluicing nozzles positioned above the leaves, until a pressure in the filter of 50 p.s.i.g. was built up, when collection of filtrate was commenced. The pressure in the filter was allowed to build up to 80 p.s.i.g. in about 20 minutes, at which point the filtration rate was about 2.53 gallons per square foot of filter area per hour. Filtration was continued while maintaining the pressure at about 80 p.s.i.g. until the filtration rate had dropped to about 1.29 gallons per square foot per hour, a period of about 1⅓ hours during which time the filtration rate averaged 1.48 gallons per square foot per hour. Filtration was then stopped. The clarified tar in the filtrate, amounting to 651 gallons, was tested and found to contain 0.22% quinoline-insoluble material. The filter cake weighed 551 pounds and contained about 50% solids. The tar in the filter was then drained and returned to the feed tank. Approximately 643 gallons of sludge tar from a previous run, containing 8.7% quinoline-insolubles, was passed into the sludge tar tank from which it was fed into the sluicing nozzles, after adjusting its temperature to about 340° F. The sluicing tar, spraying onto the filter leaves, washed accumulated cake from the leaves, and this tar, with accumulated filter solids, was recirculated through the system while maintaining its temperature at about 340° F. until the filters were clear of solids, i.e. a period of about 45 minutes. Then the sluice tar was collected in the sludge tar tank. The sludge tar amounting to 694 gallons had a quinoline-insoluble content of 12.0%.

Example 4

644 gallons of crude tar containing 5.7% quinoline-insoluble material and having a viscosity at 340° F. of 38 SSU, was fed at about 340° F. to a vertical leaf filter equipped with screens of 24 x 110 mesh, and with sluicing nozzles positioned above the leaves, until a pressure in the filter of 50 p.s.i.g. was built up, when collection of filtrate was commenced. The pressure in the filter was allowed to build up to 84 p.s.i.g. in about 20 minutes, at which point the filtration rate was about 2.19 gallons per square foot of filter area per hour. Filtration was continued while maintaining the pressure at about 84 p.s.i.g. until the filtration rate had dropped to about 0.96 gallons per square foot per hour, a period of about 1⅓ hours during which time the filtration rate averaged 1.31 gallons per square foot per hour. Filtration was then stopped. The clarified tar in the filtrate amounting to 576 gallons was tested and found to contain 0.08% quinoline-insoluble material. The filter cake weighed 712 pounds and contained about 50% solids. The tar in the filter was drained and returned to the feed tank. Approximately 376 gallons of sludge tar from a previous run containing 12.0% quinoline-insolubles was passed into a sludge tar tank from which it was fed into the sluicing nozzles, after adjusting its temperature to about 325° F. The sluicing tar, spraying onto the filter leaves, washed accumulated cake from the leaves, and this tar, with accumulated filter solids, was recirculated through the system while maintaining its temperature about 325° F. until the filters were clear of solids, i.e. a period of about 45 minutes. Then the sluice tar was collected in the sludge tar tank. The sludge tar amounting to 444 gallons had a quinoline-insoluble content of 18.1%.

*Example 5*

2.08 gallons of crude tar containing 4.5% quinoline-insoluble material and having a viscosity at 270–295° F. of 40–50 SSU, was fed at about 270–295° F. to a vertical leaf filter equipped with screens of 28 x 500 mesh, and with sluicing nozzles positioned above the leaves, until a pressure in the filter of 25 p.s.i.g. was built up, when collection of filtrate was commenced. The pressure in the filter was allowed to build up to 45 p.s.i.g. in about 10 minutes, at which point the filtration rate was about 4.2 gallons per square foot of filter area per hour. Filtration was continued while maintaining the pressure at about 45 p.s.i.g. until the filtration rate had dropped to about 1.3 gallons per square foot per hour, a period of about one hour, during which time the filtration rate averaged 1.38 gallons per square foot per hour. Filtration was then stopped. The clarified tar in the filtrate, amounting to 1.35 gallons, was tested and found to contain 0.24% quinoline-insoluble material. The tar in the filter, amounting to about 1.1 gallon, was then drained into a sludge vessel from which it was fed into the sluicing nozzles, after adjusting its temperature to about 300° F. The sluicing tar, spraying onto the filter leaves, washed accumulated cake from the leaves, and this tar, with accumulated filter solids, was recirculated through the system while maintaining its temperature at about 300° F. until the filters were clear of solids, i.e. a period of about 10 minutes. Then the sluice tar was collected in the sludge tar tank. The sludge tar had a quinoline-insoluble content of 8.75%.

*Example 6*

One and fifty-four one hundredths gallons of crude tar containing 2.0% quinoline-insoluble material and having a viscosity at 287° F. of 30 SSU, was fed at about 287° F. to a vertical leaf filter equipped with screens of 28 x 500 mesh, until a pressure in the filter of 16 p.s.i.g. was built up, when collection of filtrate was commenced. The pressure in the filter was allowed to build up to 28 p.s.i.g. in about 10 minutes, at which point the filtration rate was about 4.5 gallons per square foot of filter area per hour. Filtration was continued while maintaining the pressure at 28 p.s.i.g. until the filtration rate had dropped to about 1 gallon per square foot per hour, a period of about one hour, during which time the filtration rate averaged 2.37 gallons per square foot per hour. Filtration was then stopped. The clarified tar in the filtrate, amounting to 1.49 gallons, was tested and found to contain 0.12% quinoline-insoluble material. The filter cake contained 52.3% solids. When this cake is sluiced with 2.1 gallons of crude tar of the same character as the feed tar (i.e. containing 2% quinoline-insolubles) a sludge is produced containing about 3.3% quinoline-insoluble material.

*Example 7*

One and twenty one hundredths gallons of crude tar containing 2.6% quinoline-insoluble material and having a viscosity at 287° F. of 42 SSU, was fed at about 287° F. to a vertical leaf filter equipped with screens of 100 x 950 mesh, until a pressure in the filter of 23 p.s.i.g. was built up, when collection of filtrate was commenced, at which point the filtration rate was about 6.3 gallons per square foot of filter area per hour. Filtration was continued while maintaining the pressure at about 23 p.s.i.g. until the filtration rate had dropped to about 0.54 gallons per square foot per hour, a period of about one hour during which time the filtration rate averaged 1.28 gallons per square foot per hour and quinoline-insolubles in the filtrate were 0.1%. Filtration was continued another hour, then stopped. The clarified tar in the filtrate amounting to 1.15 gallons, was tested and found to contain 0.09% quinoline-insoluble material. The filter cake contained about 54% quinoline-insoluble material. When this filter cake is sluiced from the filter and dispersed with 1.25 gallons of crude tar of the same character as the feed tar (i.e. 2.6% quinoline-insoluble material), a sludge tar is produced containing about 4.8% quinoline-insoluble material.

*Example 8*

One and thirty one hundredths gallons of crude tar containing 2.6% quinoline-insoluble material and having a viscosity at 287° F. for SSU, was fed at about 287° F. to a vertical leaf filter equipped with screens of 80 x 700 mesh, until a pressure in the filter of 23 p.s.i.g. was built up, when collection of filtrate was commenced, at which point the filtration rate was about 8.4 gallons per square foot of filter area per hour. Filtration was continued while maintaining the pressure at about 23 p.s.i.g. until the filtration rate had dropped to about 0.5 gallons per square foot per hour, a period of about one hour during which time the filtration rate averaged 1.35 gallons per square foot per hour, and quinoline-insolubles in the filtrate were 0.1%. Filtration was then continued for another hour at an average rate of 0.61 gallons per square foot per hour and then stopped. The filter cake contained 49.1% quinoline-insoluble material. When this filter cake is sluiced from the filter and dispersed with 1.29 gallons of crude tar of the same character as the feed tar (i.e. 2.6% quinoline-insoluble material), a sludge tar is produced containing about 4.9% quinoline-insoluble material.

While the above describes the preferred embodiments of the invention, it will be understood that departures may be made therefrom within the specification and claims.

We claim:

1. The process for treating heavy coal tar hydrocarbons containing naturally occurring finely divided particles suspended therein, selected from the group consisting of coal tars and pitches derived therefrom, containing at least about 1% of quinoline-insoluble material and having viscosities at temperatures between about 175° and about 500° F. not greater than about 100 SSU, which comprises passing said hydrocarbon at temperatures in the range between about 175° F. and about 500° F. under pressures of between about 20 p.s.i.g. and about 200 p.s.i.g. through vertical leaf filter screens having openings no greater than about 162 microns, continuing said passage of said hydrocarbon through said filter screens at an average filtration rate between about 0.75 gallon per square foot of filter area per hour and about 2.5 gallons per square foot per hour, until a substantial filter cake has accumulated on the outer surfaces of the filter screens, discontinuing the filtration before the actual filtration rate drops below about 0.5 gallon per square foot per hour, recovering the resulting clarified filtrate, and substantially immediately after cessation of the filtration and, before said filter cake has cooled below about 250° F. contacting said cake with a plurality of sprays of hot coal tar hydrocarbon having quinoline-insoluble characteristics and viscosity characteristics within the range defined above, at a temperature between about 200° F. and about 400° F., directed upon the filter cake on the outside surfaces of said filter leaves whereby said filter cake is dislodged from said filter screens, and dispersed in said hot coal tar hydrocarbon and recovering the resulting hydrocarbon-filter cake slurry enriched in quinoline-insoluble content but otherwise similar in characteristics to the original coal tar hydrocarbon.

2. The process according to claim 1 wherein the quinoline-insoluble content of the tar is between about 1% and about 12%.

3. The process according to claim 2 wherein the viscosity of the tar is between about 30 SSU and about 100 SSU.

4. The process according to claim 3 wherein the temperature of filtration is between about 225° F. and about 350° F. and the pressure is between about 20 p.s.i.g. and about 100 p.s.i.g.

References Cited in the file of this patent

UNITED STATES PATENTS

| | | |
|---|---|---|
| 1,830,962 | Read et al. | Nov. 10, 1931 |
| 2,044,214 | Jones | June 16, 1936 |
| 2,297,455 | Brautigam et al. | Sept. 29, 1942 |
| 2,631,982 | Donegan | Mar. 17, 1953 |
| 2,683,107 | Juel | July 6, 1954 |

UNITED STATES PATENT OFFICE
CERTIFICATE OF CORRECTION

Patent No. 2,956,944            October 18, 1960

Bruce G. Logan et al.

It is hereby certified that error appears in the printed specification of the above numbered patent requiring correction and that the said Letters Patent should read as corrected below.

Column 10, line 26, for "287° F. for" read -- 287° F. of 42 --.

Signed and sealed this 11th day of April 1961.

(SEAL)
Attest:
ERNEST W. SWIDER
Attesting Officer

ARTHUR W. CROCKER
Acting Commissioner of Patents